United States Patent Office 3,049,575
Patented Aug. 14, 1962

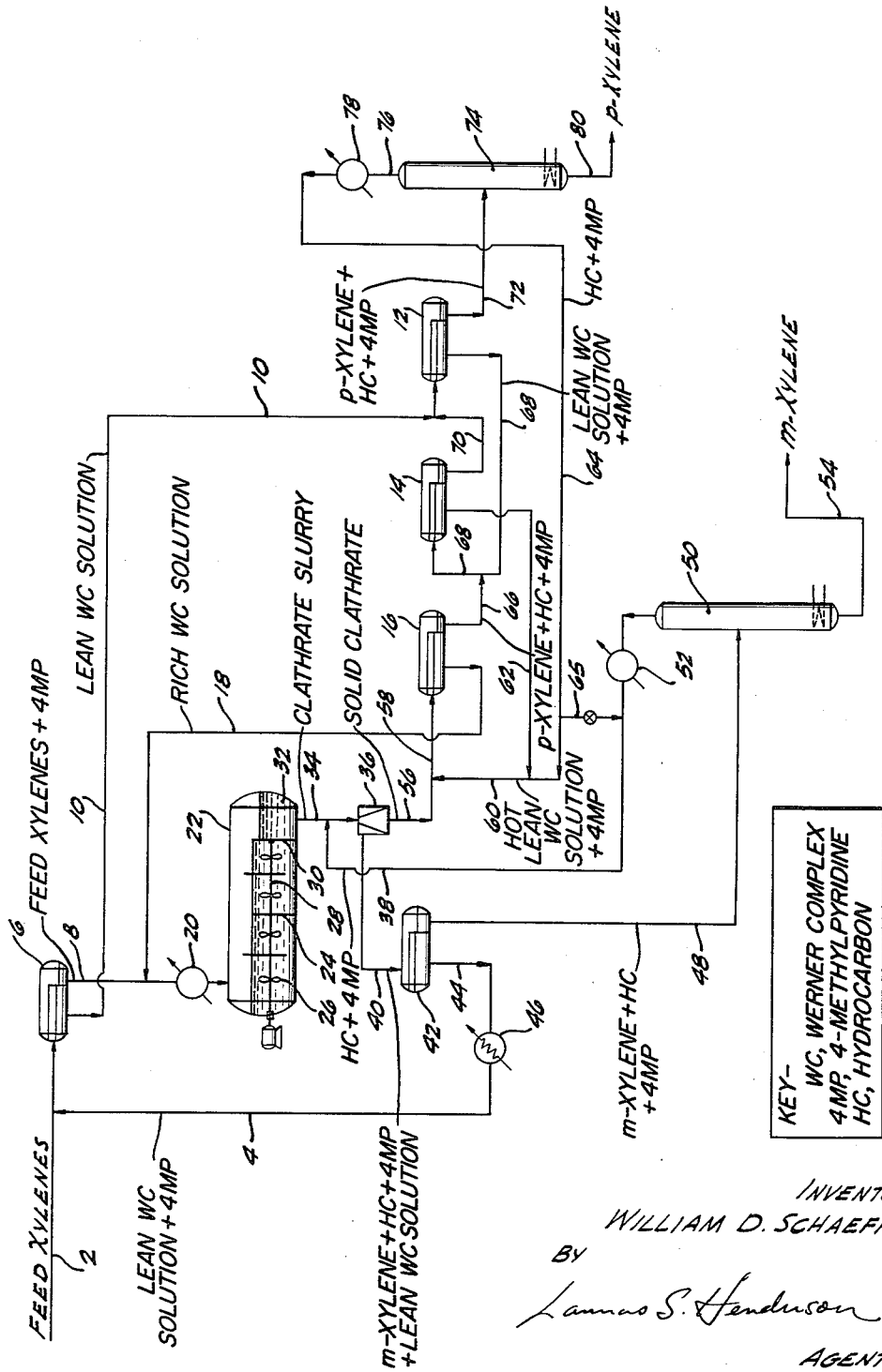

3,049,575
SEPARATION OF ORGANIC COMPOUNDS
William D. Schaeffer, Pomona, Calif., assignor to Union Oil Company of California, Los Angeles, Calif., a corporation of California
Filed Jan. 18, 1960, Ser. No. 3,058
22 Claims. (Cl. 260—674)

This invention relates to methods for separating difficultly separable organic compounds such as isomers, e.g., xylenes and the like, by selective clathration with heterocyclic base Werner complexes. Essentially, the method consists in contacting the feed mixture with a solution of the Werner complex in an aqueous-alkanolamine solution, then lowering the temperature to effect precipitation of the solid clathrate, and finally recovering the clathrated component by dissolving the clathrate in aqueous-alkanolamine solution at a relatively high temperature. It has been found that aqueous alkanolamine solutions display a remarkably large temperature coefficient of solubility for the Werner complexes and their clathrates, and that they do not interfere with the normal clathrating properties of the Werner complexes. Hence, they constitute highly advantageous solvent media for effecting clathration and de-clathration by simply shifting the temperatures over a relatively small range.

Another advantageous feature of the aqueous-alkanolamine solvents applies particularly to the separation of hydrocarbons, or other water-insoluble mixtures. It has been found that, despite the high solvent capacity of these solvents for the Werner complex at temperatures of 50–120° C., they exhibit very little solvent capacity for hydrocarbons or other hydrophobic mixtures over the entire temperature ranges used for clathration and de-clathration. It has also been found that the clathrate crystals form preferentially in the non-aqueous, or hydrocarbon, phase. Hence, the feed mixture is not diluted by solvent during clathration, and maximum clathration efficiency is attained, since under these conditions the clathratable component is at its maximum activity.

The present invention is based upon my basic discovery that certain organic Werner complexes are capable of selectively absorbing or occluding, either during or after formation of their crystalline structure, certain organic compounds, while other organic compounds of similar chemical and physical properties are absorbed to a much smaller extent, or not at all (U.S. Patent No. 2,798,891). The specific explanation for this phenomenon is not known with certainty, but present information indicates that a "clathrate" type compound may be formed.

The "clathration" mechanism of the present invention differs from that of the classical forms of clathration, as described for example by Powell (J. Chem. Soc. (London) 1948 pp. 61–73). The classical clathrate formers are non-versatile; they will form stable clathrates only with foreign molecules of one particular dimension, coinciding with the dimensions of the crystal void spaces of the clathrate former. But the organic Werner complex clathrate formers described herein are found to be versatile in their clathrating properties. It is not essential that the included foreign molecules coincide in size or shape with the pre-existing crystal void spaces of the Werner complex. The same Werner complex will form clathrates with molecules varying widely in size and shape, from for example benzene to anthracene.

Compounds which are predominantly aromatic in character exhibit a markedly greater tendency to form clathrates with the instant Werner complexes than do the less aromatic compounds. However, even when all compounds in the mixture to be separated are equally aromatic in character, one will be selectively clathrated in preference to others. The methods of the present invention are hence applicable to the separation of mixtures of the following types:

(1) Wholly aromatic, i.e., all components are predominantly or significantly aromatic in character. In this case one aromatic compound is selectively clathrated in preference to another, due primarily to steric differences in molecular form.

(2) Partially aromatic, i.e., one component is appreciably more aromatic in character than another. In this case, the more aromatic compound or compounds will in general be selectively clathrated in preference to the less aromatic compound or compounds.

Since my discovery of the basic clathration process using organic Werner complexes, various techniques have been developed for carrying out the clathration step, and for recovering the clathrated component from the clathrate. One technique involves the use of neutral organic solvent media such as methyl Cellosolve or ethylene glycol, as described in U.S. Patents Nos. 2,849,511 and 2,849,513. Despite their virtues, these processes are disadvantageous in that they require the use of fairly large volumes of expensive solvents in which the feed mixtures are relatively soluble, thereby reducing the efficiency of clathration. They also require a considerable investment in processing equipment. Another problem which has heretofore been common to nearly all clathration techniques, including the neutral organic solvent methods, involves the necessity of using heat to dissociate the clathrated component from the clathrate. The organic Werner complexes are relatively unstable and tend to lose nitrogen base upon heating, with the result that thermal recovery of the clathrated compound tends to cause some dissociation of Werner complex, resulting in contamination of the recovered compound with nitrogen base. These difficulties are not insurmountable, and various techniques have been developed for dealing with them, as in U.S. Patent No. 2,798,102, but in general the mitigation of these problems has always involved added processing costs and equipment investment which, though entirely feasible, leave considerable room for improvement.

In my copending application, Serial No. 862,223, it has been shown that aqueous solutions of strong nitrogen bases, such as ammonia, are good solvents for the Werner complexes and their clathrates. The use of aqueous ammonia is in many respects advantageous over the use of the neutral organic solvents, but aqueous ammonia does not display a temperature coefficient of solubility for the Werner complexes at all commensurate with that of the aqueous alkanolamine solvents of this invention. Hence, in using ammonia, it has been necessary to alternately reduce and raise the ammonia concentration in order to obtain the necessary differential solubilities to effect clathrate precipitation and clathrate dissolving. This requires the continuous evaporation and transfer of large volumes of ammonia in the process, with obvious economic consequences. The process of this invention hence avoids most of the major disadvantages of both the aqueous ammonia system and the neutral organic solvent systems.

It has now been discovered that the water-insoluble Werner complexes of heterocyclic nitrogen bases can be readily dissolved in aqueous alkanolamines, and that when a saturated solution thereof is reduced in temperature by only about 25° to 75° C., the Werner complex is precipitated almost quantitatively. It has also been found that if the mixture to be separated is agitated or slurried with the Werner complex solution during precipitation from the aqueous alkanolamine solution, a remarkably efficient (in terms of specific resolution and clathration capacity)

selective clathration takes place. It has also been discovered that the resulting solid clathrate may be easily and completely dissolved in the aqueous alkanolamine solution by simply raising the temperature about 25° to 75° C., thereby liberating the clathrated component and reforming the Werner complex solution for use in the clathration step. The liberated clathrated component may then be easily recovered by decantation, settling, distillation, solvent extraction or the like.

The non-clathrated component of the feed mixture (raffinate) is separated from the clathration slurry either before or after separation of the solid clathrate therefrom. Following removal of clathrate and raffinate, the aqueous alkanolamine solution, usually containing some dissolved heterocyclic base and Werner complex, may then be reheated and used to dissolve the clathrate, thereby "springing" the clathrated compound (extract) and regenerating the Werner complex solution. Thus, a continuous recycle of aqueous alkanolamine and Werner complex may be maintained, with little or no loss of Werner complex or heterocyclic base. Small amounts of Werner complex and/or heterocyclic base may dissolve in the raffinate or extract, but may be easily recovered therefrom by distillation, solvent extraction, azeotropic distillation, or the like, as will be more particularly described hereinafter.

It will hence be apparent that the principal object of this invention is to provide a simple and economical technique for carrying out a selective clathration, and for recovering the clathrated component. Another object is to provide a method for recovering the clathrated component without substantial heating, thereby avoiding decomposition of the Werner complex and permitting recovery thereof in a form suitable for recycle. Still another object is to provide novel means for recovering the extract and raffinate fraction of the feed in pure form, uncontaminated with the Werner complex or its components. A specific object is to provide an economically competitive process for resolving close-boiling mixtures of aromatic hydrocarbons, especially the xylene isomers and cymene isomers. Other objects will be apparent from the more detailed description which follows.

Reference is now made to the attached drawing, which illustrates a continuous modification of the process employing auxiliary solvents and azeotroping agents to strip dissolved heterocyclic base from the extract and raffinate products. This modification will be described with reference to the separation of xylene isomers using monoethanolamine as the basic clathration solvent component, but it will be understood that the process is broadly applicable, with slight modifications, to the separation of other mixtures using other alkanolamines within the purview of this invention. The Werner complex employed in this modification is tetra (4-methylpyridine) nickel dithiocyanate, but other Werner complexes may also be used.

The feed xylenes are brought in through line 2 and mixed therein with recycle lean clathration solvent from line 4. This lean clathration solvent is mainly water and ethanolamine, but contains a small amount of dissolved Werner complex and about 2-6% of dissolved 4-methylpyridine. It is desired to use this lean solvent at another point in the process to extract 4-methylpyridine from the extract xylenes, and for this purpose it is first contacted with the feed xylenes to reduce its content of 4-methylpyridine. After suitable contacting at e.g., 0°-85° C., in line 2, the two-phase mixture is admitted to separator 6 from which the feed xylenes, containing dissolved 4-methylpyridine, are withdrawn via line 8, while the stripped lean clathration solvent is withdrawn via line 10. This stripped clathration solvent is then contacted in two stages with the extract xylenes in vessels 12 and 14, and then with the solid clathrate in vessel 16, as will be more particularly described hereinafter. In vessels 12 and 14, 4-methylpyridine is stripped from the extract xylenes, and in vessel 16, the clathrate is dissolved, all resulting in a rich clathration solvent in line 18, containing the dissolved Werner complex. This rich clathration solvent, at e.g., 50°–100° C., is then returned via line 18 to contact the xylene feed in line 8. The resulting two-phase mixture is then cooled in one or more heat-exchangers 20 to a suitable clathration temperature of, e.g., from about 0–40° C., and admitted directly to clathration vessel 22.

Clathration vessel 22 is divided vertically into several communicating compartments by means of staggered baffles 24. Each of the resulting compartments is provided with suitable agitating means to provide substantially uniform mixing throughout at least the major part of the vessel. In the modification illustrated, the agitating means consists of a series of propellers 26 attached to a power driven shaft 28, which traverses the vessel from the inlet end to terminal baffle 30. It will be noted that baffles 24 provide essentially a tortuous linear path to direct the fluid flow alternately under one baffle and over the top of the next. This provides uniform control over the residence time of each portion of charge, and largely prevents internal recycle. It has been found that residence times ranging between about 2 minutes and 2 hours are usually adequate, preferably between about 5 minutes and 30 minutes. Suitable temperatures range between about −50° C. up to about 80° C., and preferably between about 0° and 40° C.

As will be apparent, the feed xylenes and the rich clathration solvent enter vessel 22 at its left extremity and travel generally horizontally toward the right through each of the communicating compartments. Throughout the travel, agitator blades 26 maintain intimate admixing between the liquid phases and the solid phase as it is formed. The phase relationships obtaining during clathrate precipitation are sometimes fairly complex. The initial xylene phase is lighter than the solvent phase, but it has been observed that the clathrate crystals tend to form in, and remain associated with the xylene phase. As a result, toward the end of the clathration cycle, there may exist a lighter-than-solvent xylene phase and a heavier-than-solvent xylene-clathrate phase. Since each of these hydrocarbon phases may contain components which should be reacted with components of the other phase and/or with the solvent phase, the desirability of continuous agitation is apparent.

During clathrate formation the solvent phase becomes partially denuded of Werner complex, forming the lean solvent for recycle. It is ordinarily not feasible to employ such low temperatures as to obtain quantitatively complete precipitation of the Werner complex. This however is primarily a matter of preference and economics and is not a critical aspect of the invention. It is only necessary to precipitate sufficient Werner complex to clathrate the desired amount of para-xylene. The initial solution of Werner complex may contain from about 10 to 60 percent by weight of Werner complex, and it is ordinarily feasible to reduce this concentration to about 0.5 to 5 percent by lowering the temperature of the solution by about 25°–75° C. The initial solvent mixture may contain between about 5 percent and 80 percent by weight of ethanolamine, preferably between about 10 percent to 50 percent, the remainder being water.

Upon the desired completion of clathrate formation, the resulting clathrate slurry flows over the top of endbaffle 30 into slurry withdrawal zone 32, which may either be quiescent or agitated as desired. The resulting slurry is withdrawn via line 34 and transferred to a basket centrifuge 36, or other suitable means for separating solids from liquids, e.g., a filter or settler. It has been found desirable however to admix with the slurry prior to solids separation, a suitable paraffinic or naphthenic hydrocarbon via line 38, in order to dilute the raffinate xylene phase, thereby facilitating its separation from the adhering solid clathrate. Also, aromatic hydrocarbons such as xylenes have some slight solvent capacity for the Werner complex, and the addition of a paraffin or naphthene hydrocarbon is found to reduce substantially the solubility of the Werner complex in the raffinate xylene phase. Any liquid paraffin or naphthene hydrocarbons may be used for this purpose, but for additional purposes to be described hereinafter, it is preferred to use hydrocarbons boiling in the range of about 90 to 135° C., e.g., heptane, octane, nonane, or mixed hydrocarbon fractions boiling in this range such as a 120° to 130° C. alkylate fraction.

The liquid from centrifuge separator 36 consists of two liquid phases, viz. a raffinate phase comprising reject xylenes and paraffin hydrocarbon, and a lean solvent phase containing a small amount of dissolved Werner complex and excess 4-methylpyridine. This mixture is transferred via line 40 to a settling vessel 42 wherein stratification is allowed to take place. The lower lean solvent phase is withdrawn via line 44, reheated to about 50°–100° C., in heater 46, and passed via line 4 to line 2, where it mingles with feed xylenes, as previously described.

The hydrocarbon phase in separator 42 is transferred via line 48 to distillation column 50, which serves the primary purpose of separating the paraffin hydrocarbon from the raffinate xylenes, and the secondary but important purpose of stripping from the xylenes any 4-methylpyridine which may have become dissolved therein. The 4-methylpyridine boils very close to xylenes and is hence difficultly separable therefrom. By suitably selecting the paraffin hydrocarbon added via line 38, this problem is solved by the formation of a low boiling azeotrope between the 4-methylpyridine and the paraffin hydrocarbon. This azeotrope is taken overhead via condenser 52 and line 38, as well as any excess paraffin hydrocarbon, and the mixture is continuously recycled to the clathrate slurry in line 34. The heterocyclic base which is recycled with the paraffin in line 38 is mostly dissolved in the aqueous solvent phase of the slurry in line 34, thereby preventing its buildup in the hydrocarbon phase going to column 50. Thus, the unclathrated raffinate xylenes are withdrawn as bottoms from column 50 via line 54 in substantially pure form.

The solid clathrate from centrifuge-separator 36 is withdrawn via line 56, and blended in line 58 with hot, lean clathration solvent from lines 60 and 62, and preferably with a suitable paraffinic or naphthenic diluent from lines 60 and 64. The hydrocarbon diluent may be the same as the hydrocarbon previously described in reference to column 50, and its purpose is similar, namely to repress the solubility of the Werner complex and 4-methylpyridine in the xylene phase, and to serve as an azeotroping agent for stripping 4-methylpyridine from the extract xylenes. Since the lean clathration solvent in line 58 is at a temperature of about 25° to 75° C. higher than the clathration temperature in vessel 22, the solid clathrate rapidly becomes dissolved, thus liberating the clathrated xylene phase and forming the rich clathration solvent. The resulting two-phase liquid mixture is then passed into extract-separation vessel 16. Rich clathration solvent is withdrawn therefrom via line 18 and recycled to clathration vessel 22, as previously described.

The extract xylene phase is withdrawn from vessel 16 via line 66. This extract xylene phase is normally much richer in dissolved 4-methylpyridine than the raffinate xylene phase from separator 42, because the former was in phase equilibrium with a clathration solvent rich in Werner complex (and thus 4-methylpyridine), while the latter was in equilibrium with lean clathration solvent. Normally, the extract xylene phase may contain about 5–20 percent by weight of 4-methylpyridine, while the raffinate xylene phase will contain only about 2–10 percent. All of this 4-methylpyridine could be recovered by azeotroping with a paraffin hydrocarbon diluent boiling in the 120°–130° C. range but since the azeotrope is relatively lean in 4-methylpyridine (about 10–20 percent), large amounts of diluent would be required and the distillation load would be high where large quantities of 4-methylpyridine must be recovered. Consequently, it is preferable to use the lean clathration solvent as previously described to strip the bulk of the 4-methylpyridine from the extract xylene phase. This is accomplished by a two-stage contacting of the extract xylene phase with the lean clathration solvent in separator-extraction vessels 14 and 12. In the first stage, extract xylenes in line 66 are mingled with lean solvent in line 68 from the second extraction stage in vessel 12. The partially stripped xylene phase from vessel 14 is then withdrawn via line 70 and contacted with fresh, lean clathration solvent from line 10, and the resulting mixture separated in vessel 12. The lean solvent phase from separator 14 is then transferred via line 62 to extract-separation tank 16, as previously described.

The partially stripped extract phase from separator vessel 12, containing e.g., about 1–5 percent of 4-methylpyridine, is then withdrawn via line 72, and transferred to fractionating column 74 from which the 4-methylpyridine paraffin hydrocarbon azeotrope, plus any excess paraffin diluent, is taken overhead via line 76 and condenser 78 for recycle to line 58. A small proportion of this recycle diluent may be diverted to line 38 via line 65 to compensate for the small amount of diluent which adheres to the solid clathrate, and is thus diverted out of the raffinate recovery system and into the extract recovery system via line 56. Enriched para-xylene is withdrawn as bottoms from column 74 via line 80.

The para-xylene recovered as above described may be of substantially any desired purity depending upon the ratio of Werner complex to feed mixture and other factors such as the efficiency of contacting and completeness of clathration in vessel 22. It is ordinarily preferable not to attempt to obtain 100 percent pure p-xylene in a single stage; it is preferable to employ multi-stage clathration, or de-clathration, where high purity is desired. According to one modification of multi-stage de-clathration, the clathrate may be partially dissolved in one stage at an intermediate temperature insufficient to effect complete dissolving, and the dissolution completed in a second stage at a higher temperature. The p-xylene (or other clathrated component) recovered from the second stage of dissolving will be of substantially higher purity than the xylene recovered from the first stage. The xylene recovered from the first stage may, if desired, be recycled to the clathration step along with the fresh feed.

While, as indicated above, it is generally preferred to carry out the clathration step integrally with the extract recovery system, it is not intended to exclude forming the clathrate in an extraneous system, and then decomposing the clathrate in the aqueous alkanolamine solution. For example, the clathrate may be formed by merely contacting the Werner complex with the feed mixture, or by precipitating the Werner complex from an extraneous solvent system in the presence of the feed mixture.

The Werner-type complexes employed herein are made of of at least three components. The fundamental unit is a water-soluble salt of a metal having an atomic number above 12 which is capable of forming coordinate complexes of the Werner type. This includes primarily the metals of groups IB, IIB, VIB, VIIB, and VIII of the periodic table, such for example as iron, cobalt, nickel, copper, zinc, cadmium, silver, manganese, chromium, mercury, and molybdenum. Aluminum may also be used in some instances. The preferred metals are those of atomic number 25 to 28 inclusive, i.e. manganese, iron, cobalt and nickel.

The anion of the metal salt may comprise any acid-forming negative radical, the salts of which will form relatively water-insoluble Werner complexes with heterocyclic nitrogen bases. The preferred anions are polyatomic monovalent anions, such as thiocyanate, isothiocyanate, azide, cyanate, isocyanate and cyanide. Other operable anions include formate, acetate, propionate, and the like.

The seconds major component of the Werner complexes consists of one or more heterocyclic nitrogen base or bases, which are bound to the central metal atom through coordinate bonds. The operative complexes are mainly of the tetra- and hexa-coordinate types, wherein the metal atom is coordinated with four or six atoms of basic nitrogen. The heterocyclic base should be selected so as to give a maximum selective absorption for the particular compound which is to be absorbed into the crystal lattice of the complex. For example, if it is desired to absorb p-xylene, a very suitable nitrogen base is gamma-picoline. Not all nitrogen bases are equally effective in forming complexes which will absorb the desired component. For example, the beta-picoline complex with nickel thiocyanate is not as effective as the gamma-picoline complex for absorbing para-xylene, presumably because of the steric effects of the 3-methyl group. However, the beta-picoline complex may be used advantageously for absorbing other compounds. The nitrogen bases should therefore be selected by a judicious combination of theoretical reasoning and actual testing of the complexes with the particular mixture to be separated. The over-all molecular dimensions of the nitrogen base should preferably approximate the molecular size of the compound to be absorbed in the complex.

In general, any heterocyclic nitrogen base may be employed which is sufficiently basic to form coordinate complexes with the above-described salts. This includes monocyclic and polycyclic compounds, wherein at least one of the heterocycles contains from one to three hetero-N atoms. In over-all size, the nitrogen base may contain from three to about thirty carbon atoms, preferably from four to fifteen. Interfering functional groups such as —COOH should be absent, but other more neutral, relatively non-coordinating functional groups may be present such as halogen, hydroxyl, nitro, alkoxy, aryloxy, amino, cyano, carboalkoxy, alkanoyl, acetyl, etc., provided such functional groups are compatible with any functional groups present in the mixture of compounds to be separated. Examples of suitable bases include pyridine, substituted pyridines, piperidines, substituted piperidines, and the like.

A particularly preferred class of heterocyclic bases are the resonance-stabilized bases which contain one to three, but preferably one, hetero-N atoms. Suitable examples are pyridine, the picolines, pteridine, triazole, quinoline, the quinaldines, isoquinoline, pyrimidine, pyrazine, pyridazine, and substituted derivatives of such compounds. Of this preferred class, a sub-group which is particularly versatile and useful comprises the substituted pyridines, and especially the 4-substituted, the 3-substituted, and the 3,4-disubstituted pyridines. These compounds form relatively stable Werner complexes capable of selectively forming clathrates stable at room temperatures with a wide variety of aromatic compounds. Suitable substituted pyridines comprise the following:

| | |
|---|---|
| 4-methyl pyridine | 4-chloromethyl pyridine |
| 4-ethyl pyridine | 3-methyl pyridine |
| 4-n-propyl pyridine | 3-ethyl pyridine |
| 4-isopropyl pyridine | 3-n-propyl pyridine |
| 4-n-butyl pyridine | 3-isopropyl pyridine |
| 4-n-hexyl pyridine | 3-n-butyl pyridine |
| 4-vinyl pyridine | 3-vinyl pyridine |
| 4-fluoro pyridine | 3-chloro pyridine |
| 4-chloro pyridine | 3-hydroxy pyridine |
| 4-bromo pyridine | 3-methoxy pyridine |
| 4-hydroxy pyridine | 3-acetyl pyridine |
| 4-hydroxymethyl pyridine | 3-cyano pyridine |
| 4-methoxy pyridine | Ethyl nicotinate |
| 4-amino pyridine | 3,4-dimethyl pyridine |
| Methyl isonicotinate | 3,4-diethyl pyridine |
| 4-cyano pyridine | 3-methyl, 4-ethyl pyridine |
| 4-acetyl pyridine | 4-methyl, 3-ethyl pyridine |
| 4-methyl, 3-n-hexyl pyridine | 4-acetyl, 3-methyl pyridine |
| 4-methyl, 3-cyano pyridine | 4-methoxy, 3-ethyl pyridine |
| 4-chloro, 3-methyl pyridine | Isoquinoline |

Many other similar examples could be cited, as will be apparent to those skilled in the art, and the complexes may include only one such base, or a mixture of two or more may be employed, in which case a mixed complex may be formed.

The preferred Werner complexes of monovalent anion salts of this invention may be designated by the following general formula:

$$[A_n X \cdot Z_y]$$

wherein X is the metal atom as above defined, Z is the heterocyclic nitrogen base, A is the anion as above defined, y is a number from 2 to 6, and n is a number from 1 to 3.

Examples of suitable complexes which may be employed are as follows:

$[Ni(\gamma picoline)_4(SCN_2)]$
$[Co(\gamma picoline)_4(SCN)_2]$
$[(\gamma picoline)_4(NNN)_2]$
$[Co(pyridine)_4(OCN_2)]$
$[Fe(pyrrole)_4(SCN)_2]$
$[Co(\gamma picoline)_4(CN)_2]$
$[Ag(\gamma picoline)_2(NNN)]$
$[Ni(4\text{-methylpyridine})_4(NNN)_2]$
$[Ni(4\text{-n-propylpyridine})_4(SCN)_2]$
$[Ni(isoquinoline)_4(SCN)_2]$
$[Ni(4\text{-ethylpyridine})_4(SCN)_2]$
$[Mn(4\text{-methylpyridine})_4(SCN)_2]$
$[Mn(isoquinoline)_4(SCN)_2]$ Obviously many other complexes similar to the above could be employed, not all of which would give optimum separation of all mixtures but which should be selected to meet the specifiic peculiarities of the mixture concerned.

The amount of complex to be employed, relative to the feed mixture, depends upon its specific capacity for absorbing the particular feed component concerned, and also upon the proportion of that component present in the original mixture, as well as upon the temperature of clathration. The complexes are found in general to be capable of absorbing between about 5% to 70% by weight of absorbable compounds. Optimum efficiency may require that more or less than this "stoichiometric" amount of complex be employed, depending upon its relative capacity for other components in the mixture to be resolved. In general, the amount of complex to be employed may vary between about 0.25 and 20 parts by weight per part of the feed component to be clathrated. Smaller proportions of complex will generally yield a purer extract, while the larger proportions result in more complete recovery of absorbable components from the feed mixture.

The term "clathrating" as used herein is intended to mean any absorption or adsorption by the herein described Werner complexes of a sorbable organic compound, regardless of the mechanism by which such sorption may take place. The terms "absorbate" or "extract" refer to the total feed component which is absorbed into the clathrate, thus excluding the heterocyclic nitrogen bases, which are bound by coordinate valences. The term "aromatic" is intended to include all resonance-stabilized, cyclic, unsaturated compounds, which exhibit predominantly substitution rather than addition reactions toward electrophilic reagents. (cf. Remick A.E., Electronic Interpretations of Organic Chemistry, John Wiley, N.Y., 1943.)

A wide variety of feed mixtures may be resolved by the methods described herein. These methods are operative for separating substantially any mixture of organic compounds wherein the components differ in molecular configuration, and wherein at least one component is substantially aromatic in character. By "substantially aromatic" is meant that at least about 20% of the carbon atoms in the molecules to be clathrated are present as digits of an aromatic ring. Any remaining carbon atoms may be present as saturated or unsaturated aliphatic side-chains, or saturated or unsaturated non-aromatic ring systems. Such compounds may contain a total of from 4 to 60 carbon atoms, preferably from 6 to 20.

A difference in "molecular configuration," as referred to herein, means a difference in molecular size or shape as a result of differences in (1) the number of atoms per molecule, and/or (2) the arrangement of atoms within the respective molecules, and/or (3) the size of the atoms present in the respective molecules.

Any number and type of functional groups may be present in the feed components, provided that such groups are compatible with the Werner complex employed, i.e., that such groups do not change the chemical character of the Werner complex. Generally excluded are those compounds which are either so acidic as to decompose the Werner complex, or so basic as to displace the heterocyclic base from the Werner complex. In general, the pH of an aqueous mixture of the compounds to be separated should fall between about 4 and the pH of an aqueous solution of the heterocyclic base employed in the Werner complex. When the compounds are too acidic or too basic, it is feasible to prepare neutral derivatives of such compounds, e.g., salts, esters, ethers, amides, etc., and then effect separation of the neutral derivatives.

Whenever any mixture of compounds is so incompatible with the Werner complex that the normal clathration procedures herein described result primarily in chemical decomposition, change, or disruption of the Werner complex, as opposed to the desired clathration, the contacting of such mixtures with the Werner complex is by definition excluded from the term "clathration" as used herein and in the claims. Functional groups which generally do not disrupt the normal clathration reaction, and may hence be present in the feed components are as follows: —F, —Cl, —Br, —I, NO₂, aryl-NH₂, —OR, alkyl-OH, aralkyl-OH, =CO, —CHO, —CN, —SCN, —NCO, —COOR, —COR, —COO-metal, —SR,

—CONH₂ wherein R is a hydrocarbon radical. Many groups of a similar nature may be present. Functional groups which are generally, though not always, disruptive and to be avoided are —SH, aryl-OH, —COOH, and the like, unless they are first converted to more nearly neutral derivatives.

Examples of mixtures which may be separated herein include the following, but these examples are by no means exhaustive:

(A) Hydrocarbon mixtures:
o-Ethyl toluene
p-Ethyl toluene o-Ethyl toluene
m-Ethyl toluene p-Ethyl toluene
m-Ethyl toluene Mesitylene
Pseudocumene Cumene
Mesitylene Cumene
Pseudocumene p-Cymene
p-Diethylbenzene m-Cymene
Mesitylene Prehnitene
Durene Durene
Isodurene Prehnitene
Isodurene Cyclohexane
Benzene Methyl-cyclohexane
Toluene Benzene
n-Heptane Benzene
2,3-dimethyl pentane Methyl cyclopentane
Benzene Picene
Chrysene Picene
1,2,5,6-dibenzanthracene Tetralin
Naphthalene Tetralin
Decalin Diphenyl
Diphenyl methane Anthracene
Phenanthrene 1-methyl anthracene
1-methyl phenanthrene Naphthalene
Diphenyl 1-methyl anthracene
2-methyl anthracene 1-methyl naphthalene
2-methyl naphthalene 1-ethyl naphthalene
2-ethyl naphthalene p-Di-n-propyl benzene
Hexamethyl benzene o-Cymene
p-Cymene o-Cymene
m-Cymene m-Cymene
p-Cymene p-Methyl styrene
m-Methyl styrene p-Methyl styrene
o-Methyl styrene (B) Hydrocarbon-non-hydrocarbon mixtures:
2,5-dimethyl furan
Benzene Anthraquinone
Anthracene Benzene
Thiophene 2-methyl thiophene
Toluene o-Xylene
Thiophene (C) Non-hydrocarbon mixtures:
o-Methyl toluate
p-Methyl toluate o-Methyl toluate
m-Methyl toluate p-Methyl toluate
m-Methyl toluate 1-nitro naphthalene
2-nitro naphthalene 1-amino naphthalene
2-amino naphthalene Anilene
Nitrobenzene o-Toluidine
p-Toluidine o-Nitrotoluene
p-Nitrotoluene o-Dichlorobenzene
p-Dichlorobenzene o-Chlorotoluene
p-Chlorotoluene o-Methyl anisole
p-Methyl anisole Coumarin
Vanillin Furan
Thiophene Sodium p-cresylate
Sodium m-cresylate Potassium terephthalate
Potassium isophthalate Dimethyl isophthalate
Dimethyl terephthalate Dimethyl isophthalate
Dimethyl orthophthalate Sodium o-toluene sulfonate
Sodium p-toluene sulfonate Sodium-1-methyl-3-naphthalene sulfonate
Sodium-1-methyl-4-naphthalene sulfonate Estriol
Estrone Estriol
Estradiol Picolinic acid
Nicotinic acid Thymol
Menthol 2-naphthol-6-sodium sulfonate
2-naphthol-8-sodium sulfonate p-Amino benzaldehyde
o-Amino benzaldehyde Benzidine
p-Semidine 2,4-dinitro-chloro-benzene
2,5-dinitro-chloro-benzene Isosafrol
Piperonal o-Vanillin
Isovanillin o-Vanillin
Vanillin o-Phenylene diamine
p-Phenylene diamine p-Phenetidine
Phenacetin Isoeugenol
Vanillin p-Methyl thiophenol
m-Methyl thiophenol Diazoaminobenzene
p-Aminoazobenzene N,N-dimethyl aniline
Aniline Methyl benzoate
Ethyl benzoate Terephthalonitrile
Isophthalonitrile p-Tolunitrile
m-Tolunitrile Methyl salicylate
Methyl p-hydroxy benzoate p-Methyl acetanilide
m-Methyl acetanilide p-Aminobenzenesulfonamide
m-Aminobenzenesulfonamide Sodium anthranilate
Sodium phthalamate Alpha-picoline
Beta-picoline 2,4-lutidine
2,6-lutidine It will be noted that some of the foregoing compounds are fairly soluble in water, and thus in the clathration solvent. In general this does not critically affect the clathration or de-clathration steps, but may necessitate using different techniques for recovering the raffinate and extract products from the clathration solvent. Conventional techniques such as solvent extraction, distillation, fractional crystallization, chemical scavenging, precipitation or the like may be utilized for this purpose, the choice of the particular method depending upon the particular compounds involved, as will be understood by those skilled in the art.

Other alkanolamines which may be used in place of mono-ethanolamine include for example, diethanolamine, triethanolamine, 2-amino-n-butanol, 2-amino-2-methyl-1-propanol, 2-methylamino ethanol, 2-ethylamino ethanol, 2-amino-2-ethyl-1, 3-propanediol, 2-amino-2-methyl-1,3-propanediol, and the like. In general any lower alkanolamine containing from two to about ten carbon atoms, from one to three amino groups, and from one to three hydroxyl groups, may be employed, including primary, secondary, and tertiary amines. The operative ratios of alkanolamine in the clathration solvent may vary widely, e.g., from about 2 percent to 75 percent by weight, the remainder being water. Preferred ratios generally fall within the range of about 10 percent to 50 percent. The greater the concentration of alkanolamine in the solvent, the greater will be the solubility of Werner complex and feed mixture therein. It is preferred to use sufficient water to render the feed substantially insoluble.

The following examples are cited to illustrate more concretely the results obtainable in the practice of this process, but are not to be construed as limiting in scope.

EXAMPLE I

*Run No. 1.*—To a 300 ml. 3-necked flask equipped with a stirrer, condenser and thermometer is added 40 g. of Ni(4-methylpyridine)$_4$(SCN)$_2$, 40 ml. of ethanolamine and 120 ml. of water. The mixture is heated and stirred until solution is complete (92° C.). To the hot solution is added 23 ml. of feed xylenes and the mixture is cooled to 25° C. in a water bath, resulting in precipitation of solid clathrate. After stirring at 25° C. for 10 minutes, 40 ml. of isooctane is added and, after an additional 2 minutes of stirring, the mixture is filtered. The filtrate consists of two liquid phases: a clear and colorless raffinate hydrocarbon phase and a blue aqueous solvent phase. The phases are separated, and the solid clathrate is redissolved in the aqueous solvent phase at 92 °C., liberating the extract xylenes. Anaylses of the respective xylene phases gives results tabulated in Table 1.

The results of three other runs conducted in a manner analogous to the above, but using somewhat different solvent ratios and compositions, are also given in Table 1:

It is thus apparent, by comparison with run No. 3 of Example I, that p-xylene of much higher purity is obtainable by dissolving the clathrate in two stages. It will be noted that the xylenes from the intermediate dissolving temperature have almost the same composition as the feed, and can hence be recycled with fresh feed.

EXAMPLE III

This example illustrates the large temperature coefficient of solubility of the aqueous alkanolamine solvents for Werner complexes. The solubility of nickel tetra(4-methylpyridine)dithiocyanate in the 40% ethanolamine-60% water solvent, was determined at various temperatures, with the following results:

Table 1

| Run No. | Vol. percent MEA[1] in solvent | Wt. ratio, Solvent: Werner Complex | Sol'n[2] Temp., °C. | | Isomer Distribution | | | | Recovery[3] | |
|---|---|---|---|---|---|---|---|---|---|---|
| | | | | | para | meta | ortho | Et.Bz. | para | meta |
| | | | | Feed | 14.8 | 81.2 | 0.6 | 3.4 | | |
| 1 | 25 | 4.0 | 92 | Extract xylenes | 47.2 | 47.0 | 0.3 | 5.5 | 92.6 | 16.5 |
| | | | | Reject xylenes | 0.9 | 96.4 | 0.5 | 2.2 | 7.4 | 83.5 |
| 2 | 33 | 3.0 | 83 | Extract xylenes | 48.3 | 46.1 | 0.3 | 5.4 | 92.9 | 18.9 |
| | | | | Reject xylenes | 1.2 | 95.6 | 0.6 | 2.6 | 7.1 | 81.1 |
| 3 | 40 | 3.0 | 73 | Extract xylenes | 49.4 | 45.2 | 0.2 | 5.2 | 93.8 | 18.1 |
| | | | | Reject xylenes | 1.2 | 95.9 | 0.5 | 2.4 | 6.2 | 81.9 |
| 4 | 45 | 3.0 | 64 | Extract xylenes | 52.3 | 42.5 | 0.2 | 5.0 | 90.1 | 17.4 |
| | | | | Reject xylenes | 1.5 | 95.2 | 0.5 | 2.8 | 9.9 | 82.6 |

[1] MEA = mono-ethanolamine.
[2] Temperature required to dissolve the clathrate in the solvent portion employed.
[3] Vol. percent isomer charged recovered in that phase.

EXAMPLE II

This example demonstrates the effect of two-stage decomposition of the solid clathrate, to obtain increased purity of extract xylenes.

In two parallel experiments, the feed xylenes were clathrated at 25° C. in a 40% ethanolamine-60% water solvent, by the general procedure described in Example I, using nickel tetra(4-methylpyridine)dithiocyanate as the clathrate former. In each case, the resulting solid clathrate was then mixed with 3 parts by weight of the aqueous-ethanolamine solvent and heated to an intermediate dissolving temperature, and the liberated xylene phase was separated from the remaining slurry of undissolved clathrate. The remaining slurry was then heated to a higher temperature (about 75° C.) to complete the dissolving of clathrate, and the liberated xylenes separated by decantation. Analyses of the respective xylene phases gave the following results:

Table 2

| Run No. | Intermediate dissolving temperature, °C. | | Isomer Distribution | | | |
|---|---|---|---|---|---|---|
| | | | para | meta | ortho | Et. Bz. |
| | | Feed | 14.8 | 81.2 | 0.6 | 3.4 |
| 5 | 45 | xylenes from inter. temp. | 15.9 | 79.2 | 0.4 | 5.0 |
| | | xylenes from final dissolving | 69.2 | 25.8 | 0.2 | 4.8 |
| 6 | 55 | xylenes from inter. temp. | 14.0 | 81.1 | 0.3 | 4.6 |
| | | xylenes from final dissolving | 70.2 | 25.1 | 0.2 | 4.5 |

Conditions: Werner complex/p-xylene (wt. ratio)—13.7. Holding time at each temperature—10 minutes.

Table 3

| Temperature, °C. | Solubility of Werner complex, gms./100 gms. solvent |
|---|---|
| 0 | 1.6 |
| 15 | 3.3 |
| 25 | 5.3 |
| 35 | 8.0 |
| 73 | 33.2 |

Thus, when using a clathration temperature of 0° C. and a solution temperature of 73° C., over 95% of the Werner complex can be precipitated during clathration, and all of the resulting clathrate can be redissolved at 73° C.

EXAMPLE IV

This example illustrates the effectiveness of paraffin hydrocarbons as azeotroping agents for separating 4-methylpyridine from xylenes. n-Octane was used as the azeotroping agent in a 90-plate Oldershaw column operated at 30:1 reflux ratio. The initial xylene charge contained 4 weight-percent 4-methylpyridine, and the xylene bottoms contained only 0.07% 4-methylpyridine. The n-octane azeotrope contained 15.5 weight percent 4-methylpyridine. Other parafinic hydrocarbons form azeotropes as follows:

Table 4

| Light alkylate fraction, B.P., °C. | 4-methyl-pryidine-alkylate azeotrope, B.P., °C. | Wt. percent 4-methylpyridine in azeotrope |
|---|---|---|
| 112.7 | 112.6 | 4.2 |
| 117.7 | 117.4 | 7.6 |
| 122.2 | 121.8 | 9.1 |
| 125.4 | 124.6 | 14.7 |

EXAMPLE V

Other Werner complexes can be substituted for the nickel tetra(4-methylpyridine) dithiocyanate used in Example I to obtain resolutions of similar efficiency, but wherein isomers other than the para-xylene are sometimes selectively clathrated. For example, in treating a xylene mixture containing 20% p-xylene, 45.5% m-xylene, 19.3% o-xylene and 15.3% ethylbenzene, under conditions described in Example I, the isomers selectively clathrated are as follows:

*Table 5*

| Werner complex | Isomer selectively clathrated |
| --- | --- |
| 1. $Ni(SCN)_2 \cdot (3\text{-cyano-pyridine})_4$ | para. |
| 2. $Ni(SCN)_2 \cdot (3\text{-amido-pyridine})_4$ | para. |
| 3. $Ni(SCN)_2 \cdot (\text{ethylisonicotinate})_4$ | para. |
| 4. $Ni(SCN)_2 \cdot (4\text{-hydroxymethyl pyridine})_4$ | ortho. |
| 5. $Mn(CN)_2 \cdot (4\text{-ethylpyridine})_4$ | ortho. |
| 6. $Mn(CNO)_2 \cdot (4\text{-ethylpyridine})_4$ | ortho. |
| 7. $Ni(SCN)_2 \cdot (3\text{-ethyl-4-methyl pyridine})_4$ | meta. |
| 8. $Ni(SCN)_2 \cdot (4\text{-acetylpyridine})_4$ | Et. Bz. |

EXAMPLE VI

The nickel tetra(4-methyl pyridine) dithiocyanate complex of Example I can also be utilized for the separation of non-hydrocarbon di-substituted benzene isomers. For example, in utilizing this complex according to the procedure of Example I, the ortho-, meta- and para-isomers of mixed chloro-toluenes, dichloro benzenes, toluidines, nitro-toluenes and methyl anisoles are effectively resolved, in each case the para-isomer being selectively clathrated.

The complexes employed in the above examples may be employed for effecting separations of other mixtures, and may be interchanged in the various examples, to effect varying degrees of resolution. Likewise, many similar complexes could be substituted for those set forth in the examples.

The foregoing disclosure of this invention is not to be considered as limiting since many variations may be made by those skilled in the art without departing from the scope or spirit of the following claims.

I claim:

1. A method for recovering an aromatic compound from a clathrate thereof with a Werner complex consisting of a salt of a metal of atomic number above 12 coordinated with at least 2 mole proportions of a heterocyclic nitrogen base, which comprises dissolving said clathrate in an aqueous solution of a lower alkanolamine and separating said organic compound from the resulting solution of Werner complex.

2. A method as defined in claim 1 wherein said alkanolamine is mono-ethanolamine.

3. A method as defined in claim 1 wherein said heterocyclic base is a pyridine ring compound, and wherein said metal salt is selected from the class consisting of the thiocyanates, isothiocyanates, cyanates, isocyanates, cyanides and azides of manganese, iron, cobalt and nickel.

4. A method as defined in claim 3 wherein said clathrated organic compound is a benzenoid hydrocarbon.

5. A method as defined in claim 1 wherein said clathrated compound is p-xylene.

6. A method for altering the composition of a feed mixture of organic compounds including at least one aromatic compound differing in molecular configuration from another compound in said mixture, which comprises (1) forming a solution of a heterocyclic nitrogen base Werner complex in an aqueous solution of a lower alkanolamine; (2) mixing the resulting solution with said feed mixture; (3) cooling the resulting mixture to effect precipitation of a solid clathrate of said aromatic compound with said Werner complex; (4) separating said solid clathrate from the liquid phase; (5) recovering clathrated aromatic compound from said clathrate, and (6) recovering non-clathrated organic compounds from the mother liquor of said clathration step.

7. A method as defined in claim 6 wherein said clathrated aromatic compound is recovered from the clathrate by the method of claim 1.

8. A method as defined in claim 6 wherein said alkanolamine is mono-ethanolamine.

9. A method as defined in claim 6 wherein said heterocyclic base is a pyridine ring compound, and wherein said metal salt is selected from the class consisting of the thiocyanates, isothiocyanates, cyanates, isocyanates, cyanides and azides of manganese, iron, cobalt and nickel.

10. A method as defined in claim 6 wherein said clathrated organic compound is a benzenoid hydrocarbon.

11. A method as defined in claim 6 wherein said clathrated compound is p-xylene.

12. A method for resolving a mixture of disubstituted benzene isomers including a para isomer which comprises (1) forming a solution of a lower 4-alkyl pyridine Werner complex of a metal salt in an aqueous solution of a lower alkanolamine; (2) admixing the resulting solution with said isomer mixture; (3) cooling the resulting mixture to effect precipitation of a solid clathrate of said para-isomer with said Werner complex; (4) separating unclathrated isomers from the resulting mixture; (5) redissolving said clathrate in the remaining aqueous alkanolamine solvent phase at a relatively high temperature thereby liberating said para isomer; and (6) separating the enriched para isomer from the reconstituted Werner complex solution.

13. A method as defined in claim 12 wherein said alkanolamine is mono-ethanolamine.

14. A method as defined in claim 12 wherein said metal salt is a thiocyanate of a metal of atomic number 25 to 28.

15. A process for resolving a xylene mixture including p-xylene, which comprises (1) forming a solution of a 4-methyl pyridine Werner complex of a metal salt in an aqueous solution of a lower alkanolamine; (2) admixing and agitating the resulting solution with said xylene mixture while cooling the mixture to effect precipitation of a solid clathrate of p-xylene and said Werner complex; (3) adding to the resulting mixture a saturated hydrocarbon boiling between about 90° and 135° C.; (4) separating solid clathrate from the clathration mother liquor; (5) separating said mother liquor into a raffinate hydrocarbon phase and an aqueous alkanolamine solvent phase; (6) distilling said raffinate hydrocarbon phase to recover (*a*) an overhead fraction comprising 4-methyl pyridine and said saturated hydrocarbon and (*b*) a higher boiling fraction comprising raffinate xylenes; (7) recycling said overhead fraction to said step (3); (8) redissolving said clathrate in said aqueous alkanolamine solvent phase at a temperature about 25°–75° C. higher than the clathration temperature in step (2); (9) adding to the resulting mixture a saturated hydrocarbon boiling between about 90° and 135° C.; (10) separating the resulting mixture into a Werner complex solution phase and an extract hydrocarbon phase; (11) distilling said extract hydrocarbon phase to recover (*a*) an overhead fraction comprising 4-methyl pyridine and said saturated hydrocarbon and (*b*) a higher boiling fraction comprising enriched p-xylene, and (12) recycling said overhead fraction to said step (9).

16. A method as defined in claim 15 wherein said alkanolamine is mono-ethanolamine.

17. A method as defined in claim 15 wherein said metal salt is a thiocyanate of a metal selected from the class consisting of manganese, iron, cobalt and nickel.

18. A process as defined in claim 15 wherein said saturated hydrocarbon is a $C_8$ paraffin hydrocarbon.

19. In a separation process wherein an aromatic hydrocarbon mixture is subjected to selective clathration with an aqueous-alkanolamine solution of a heterocyclic base Werner complex with resultant production of a solid clathrate and a lean solvent phase, and wherein the resulting solid clathrate is dissolved in aqueous-alkanolamine to recover the clathrated hydrocarbon, the improvement which comprises subjecting the clathrated hydrocarbon recovered from said dissolving step to solvent extraction with said lean solvent phase to extract dissolved heterocyclic base therefrom, and using the resulting extract to dissolve the clathrate in said dissolving step.

20. A process as defined in claim 19 wherein, prior to said solvent extraction step, said lean solvent phase is contacted with said aromatic hydrocarbon mixture to extract dissolved heterocyclic base from the lean solvent.

21. A method for continuously resolving a feed mixture of disubstituted benzene isomers including a para-isomer which comprises: (1) forming a solution of a heterocyclic nitrogen base Werner complex in an aqueous lower alkanolamine solution; (2) admixing the resulting Werner complex solution with said feed mixture; (3) cooling the resulting liquid solution to effect precipitation of solid clathrate of a portion of said feed mixture enriched in said para-isomer with said Werner complex; (4) separating unclathrated isomers from the resulting mixture; (5) partially redissolving said solid clathrate in the remaining aqueous alkanolamine solvent phase at a temperature insufficiently high to effect complete dissolution thereof, thus liberating a portion of the clathrated feed mixture isomers; (6) substantially separating the thus-liberated feed mixture isomers from said aqueous alkanolamine solvent phase; (7) dissolving the previously undissolved portion of said solid clathrate in said aqueous alkanolamine solvent phase at a temperature sufficiently high for the purpose, thereby liberating the clathrated feed mixture material; and (8) separating the thus-liberated feed mixture material as an extract product enriched in said para-isomer, from the resulting reconstituted Werner complex solution.

22. The method of claim 21 in which the liberated feed mixture isomers separated in step (6) are recycled to admixture with fresh feed to the process.

References Cited in the file of this patent
UNITED STATES PATENTS

| | | |
|---|---|---|
| 2,774,802 | Christian | Dec. 18, 1956 |
| 2,798,891 | Schaeffer | July 9, 1957 |
| 2,849,513 | Schaeffer | Aug. 26, 1958 |